US012292347B2

(12) United States Patent
Landreau et al.

(10) Patent No.: US 12,292,347 B2
(45) Date of Patent: May 6, 2025

(54) APPARATUS FOR MEASURING THE INTERNAL GAS PRESSURE OF A COKE OVEN, ASSOCIATED COKE OVEN SYSTEM AND METHOD

(71) Applicant: ArcelorMittal, Luxembourg (LU)

(72) Inventors: Matthieu Landreau, Dunkirk (FR); Yannick Hergalant, Vany (FR)

(73) Assignee: ArcelorMittal, Luxembourg (LU)

( * ) Notice: Subject to any disclaimer, the term of this patent is extended or adjusted under 35 U.S.C. 154(b) by 190 days.

(21) Appl. No.: 17/913,286

(22) PCT Filed: Mar. 30, 2020

(86) PCT No.: PCT/IB2020/053018
§ 371 (c)(1),
(2) Date: Sep. 21, 2022

(87) PCT Pub. No.: WO2021/198727
PCT Pub. Date: Oct. 7, 2021

(65) Prior Publication Data
US 2023/0135338 A1    May 4, 2023

(51) Int. Cl.
| | | |
|---|---|---|
| G01L 19/00 | (2006.01) | |
| C10B 41/00 | (2006.01) | |
| C10B 45/00 | (2006.01) | |
| G01K 1/14 | (2021.01) | |

(52) U.S. Cl.
CPC .......... *G01L 19/0007* (2013.01); *C10B 41/00* (2013.01); *C10B 45/00* (2013.01); *G01K 1/14* (2013.01); *G01L 19/0092* (2013.01)

(58) Field of Classification Search
CPC ............ G01L 19/0007; G01L 19/0092; G01L 19/0053; G01L 19/147; C10B 41/00; C10B 45/00; C10B 41/08
See application file for complete search history.

(56) References Cited

FOREIGN PATENT DOCUMENTS

| | | |
|---|---|---|
| CN | 106595948 A | 4/2017 |
| CN | 206960007 U | 2/2018 |
| CN | 109838774 A | 6/2019 |
| CN | 110283604 A | 9/2019 |
| IN | 1943CHENP2013 A | 3/2013 |
| JP | H07207271 A | 8/1995 |
| JP | 2015102262 A | 6/2015 |

(Continued)

OTHER PUBLICATIONS

English machine translation of KR 101984657, obtained from GOOGLE (Year: 2019).*
English machine translation of KR 100711781 (Year: 2007).*

*Primary Examiner* — Renee Robinson
(74) *Attorney, Agent, or Firm* — Davidson Kappel LLC

(57) ABSTRACT

An apparatus (20) for measuring internal gas pressure of a coke oven (31) including a guide (24) receiving at least three pressure probes (21,22,23) each connected to a pressure sensor (61,62,63), wherein, said guide (24) has a circular cross section then forming a tubular guide (24). method (70) for manufacturing the apparatus is also provided. A coke oven (31) including at least one hole (301) through which the above apparatus (20) is inserted horizontally such that a front part of each of the three pressure probes (21,22,23) is inside the coke oven (31) and a rear part of each of the three pressure probes (21,22,23) is outside the coke oven (31).

13 Claims, 5 Drawing Sheets

(56) References Cited

FOREIGN PATENT DOCUMENTS

| KR | 19990052243 A | | 7/1999 | |
|----|---|---|---|---|
| KR | 100711781 B1 | | 4/2007 | |
| KR | 101984657 | * | 5/2019 | ............. C10B 25/16 |
| WO | WO 89/12809 | * | 12/1989 | ............... G01L 7/00 |

* cited by examiner

APPARATUS FOR MEASURING THE INTERNAL GAS PRESSURE OF A COKE OVEN, ASSOCIATED COKE OVEN SYSTEM AND METHOD

The technical field of the invention is the field of coke oven internal gas pressure measurement.

The present invention mainly concerns an apparatus comprising a particular arrangement of probes for measuring the internal gas pressure of a coke oven.

BACKGROUND

In steel production using the blast furnace route, coke is necessary as it is used as the fuel source in the ironmaking blast furnaces.

Coke is manufactured by heating coal to very high temperatures, usually around 1000° C., in so-called "coke ovens" which are thermally insulated chambers. During the cooking of coal, organic substances in the coal blend vaporize or decompose, producing coal-gas and coal-tar (a thick dark liquid used in industry and medicine). Some of the coke ovens are made to collect these by-products for later use ("by-product" oven type) while some of them burn the by-products to supply heat to the coke oven.

SUMMARY OF THE INVENTION

During transformation of coal to coke, the coal blend is softened during consecutive plastic stages. Due to heating of ovens, two parallel plastic layers appear during coking and after several hours, approximately 13 hours, the junction of these two layers occurs. At this point, the maximum gas pressure inside the coke oven is reached and oven wall damage may occur. The internal gas pressure measured for a given coal under conventional top charge conditions can also increase after the coal charge has densified and its bulk density has increased, i.e. when oil addition technique or stamp charge process is employed, or when a change in moisture and/or grain size of the charge leads to a change in coal bulk density. Also, the carbonization rate has an influence on the measured values of internal gas pressure.

The measurement of gas pressure inside industrial coke ovens, also called internal gas pressure measurement, is one of a very few possibilities to obtain experimental data on the expansion behavior of the coal charge, preventing thus the threat of potential oven wall damage or operation failures due to an over-pressure generated by coal in coke production cycles.

Gas pressure probes are tubes that have, at one end, either squeezed horizontal or vertical tips or closed tips that have either series of holes or slits located at the tip of the tubes. These probes are based on the same principle as Pitot tubes. Some plants use double-tube or even triple-tube probes. The probes are inserted into the charge from either coke side or pusher side of the oven.

Known gas pressure measurement probes comprise a pressure sensor which provides a continuous electrical signal, such signal being then to a recorder.

An advantage of probes with squeezed tips is their low manufacturing cost but when the probe is inserted or in use, the coal can clog the tip of the probe, the probe then becoming unable to provide a reliable pressure measurement.

Another issue met may be linked to the length of the probes, for example some probes are more than 3 meters long, which makes their positioning in the geometric center of the oven hard to achieve. This centering is of high importance, as a probe which is not well centered may provide erroneous measurements.

Even when the probe is well positioned at the geometric center of the coke oven, another problem may occur: the heated walls of the coke oven do not have the same temperature. In such a case, the thermal center of the coal charge does not correspond to the geometric center of the coke oven and the probe is thus not well positioned. This can also lead to erroneous measurements of the internal gas pressure.

To solve this issue, devices were developed which comprise three probes kept at a constant distance from each other. The use of three probes allows to observe three peaks of pressure, almost always different. Only the highest peak is considered, the highest peak being measured by the probe closest to the thermal center of the charged coke oven, thus reducing the risk of erroneous measurements. For example, such configuration is described in the publication KR100711781 for which the three probes are regularly arranged on an oblique line, the central probe being longer than the others.

FIG. 1 shows the results of a measure of the internal gas pressure and of the temperature inside an industrial coke oven with a known triple probes design. The temperature is measured by a thermocouple inserted inside each probe. The gas pressure of each of the three probes is measured by three pressure sensors, one pressure sensor per probe. The three internal gas pressure curves show the three different pressure peaks measured by each sensor. As mentioned previously, the three pressure peaks 11, 12 and 13 have different values. The first peak value, corresponding to the highest pressure reached by first peak 11 is of around 10.8 kPa, the second peak value is of around 12 kPa and the third peak value is of around 14.4 kPa. Only the highest peak value is taken into account which corresponds to the third peak 13. With the known triple-probe design, a maximum pressure of 14.4 kPa is measured, which is not considered as critical regarding the damages it may imply for the coke oven. The three peaks are slightly shifted in time, which is characteristic of a bad centering of the probes. Furthermore, as shown in FIG. 1, the temperature curve shows two inflection points 14 and 15 which is also a consequence of a bad centering.

Another drawback of triple-probes design is that the three probes have to be kept at a constant distance from each other. To do so, it is necessary for example to weld a triangular metallic spacer to the probes. This welding step damages or at least weakens the structure of the probes. Moreover, the probes suffer from the extreme heat in the oven and they are distorted, mostly at the welding points with the spacers. The distortion is not the same from one probe to another, which introduces a bias in the pressure measurement. The interest of having several probes is then lost.

There is therefore a need to provide a solution allowing the measurement of gas pressure inside the coal charge during carbonization cycle that is heat resistant, reliable, and easy to insert and center.

According to a first aspect of the invention, this need is satisfied by providing an apparatus comprising a guide receiving at least three probes, each connected to a pressure sensor, and wherein said guide has a circular cross section then forming a tubular guide.

The guide allows improvement of the heat resistance of the probes and ease of insertion inside the oven. The invention firstly allows to provide an apparatus that is more heat resistant than the known apparatus of the prior art. Indeed, the guide advantageously adds a protecting layer against the heat of the coke oven to the probes. Thus, the probes are less distorted and can be reused several times, on contrary to the existing apparatuses. The measurement is improved as a result of the presence of the guide, as the less distortion the probes have to face, the better the measurement.

Moreover, the tubular shape of the guide helps to easily guide the probes inside the coke oven and to have the same positioning from one coke oven to another. Thanks to the invention, the measurement is accurate as the probes are less distorted than in the prior art and are better centered.

The apparatus according to the first aspect of the invention may also have one or more of the following characteristics, considered individually or according to any technically possible combinations thereof:

the tubular guide receives three pressure probes that are arranged in shape of an isosceles triangle.

The guide maintains the probes in the shape of a triangle for a more accurate measurement of the pressure inside a coke oven. Indeed, the triangle shape allows to have a better centering of the probes and to accurately measure around the real thermal center of the charge and not only at the geometric center of the coke oven. Furthermore, the specific shape of an isosceles triangle allows to avoid harmful interference between the probes.

each of the pressure probes are longitudinally shifted one from another.

the tubular guide is configured to receive, guide and maintain the three pressure probes by comprising two ends and two closing parts, each closing part being configured to close an end of the two ends of the tubular guide, each closing part comprising three through-holes arranged in shape of an isosceles triangle.

the closing parts are walls perforated to form the through-holes, each wall being welded to an end of the two ends of the tubular guide.

alternatively, one closing part of the two closing parts is a wall perforated to form the through-holes and welded to an end of the two ends of the tubular guide, and wherein the other closing part of the two closing parts is a conical piece comprising a tip, the conical piece being perforated to form the through-holes and having a circular periphery hermetically welded to the other end of the two ends of the tubular guide such that the tip of the conical piece is extending outside of the tubular guide.

at least one thermocouple is inserted into at least one of the three pressure probes.

the front part of each of the pressure probes comprises at least two slits facing each other.

the front part of each of the pressure probes comprises a closed end having a conical shape.

each pressure sensor is connected to the rear part of the corresponding pressure probes via at least one rubber tube.

A second aspect of the invention relates to a coke oven comprising at least one hole through which an apparatus for measuring internal gas pressure of said coke oven comprising a guide receiving at least three pressure probes each extending from a rear part to a front part, and each being connected to a pressure sensor, wherein said guide has a circular cross section then forming a tubular guide, is inserted horizontally such that a front part of each of the at least three pressure probes is inside the coke oven and a rear part of each of the at least three pressure probes is outside the coke oven.

The coke oven according to the second aspect of the invention may also have one or more of the following characteristics, considered individually or according to any technically possible combinations thereof:

the tubular guide receives three pressure probes that are arranged in shape of an isosceles triangle.

the front part of each of the pressure probes comprises at least two slits facing each other.

the front part of each of the pressure probes of the apparatus comprises a closed end having a conical shape.

each pressure sensor is connected to the rear part of the corresponding pressure probe via at least one rubber tube.

A third aspect of the invention relates to a system for measuring internal gas pressure of a coke oven comprising:

At least one apparatus as above recited,

At least one transmission module configured to transmit the at least one signal generated by each of the three pressure sensors, At least one recording module configured to record the pressure signal received from the transmission module.

The system according to the third aspect of the invention may also have one or more of the following characteristics, considered individually or according to any technically possible combinations thereof:

the transmission module is configured to transmit the pressure signal wirelessly.

A further aspect of the invention relates to a method for manufacturing the apparatus according to the first aspect of the invention comprising the steps of:

perforating a wall to form at least three through-holes welding the wall to a periphery of an end of the two ends of the tubular guide, perforating a conical piece, the conical piece comprising at least a conical wall having a circular periphery, the perforating being carried out to form three through-holes in the conical wall, performing an hermetical welding of the circular periphery of the conical wall of the conical piece to a periphery of the other end of the two ends of the tubular guide such that the tip of the conical piece is extending outside of the tubular guide and such that the arrangement of the through-holes of the conical piece matches the arrangement of the through-holes of the wall, inserting the at least three probes into the tubular guide, each probe being inserted through one through-hole of the through-holes of the wall and through a through-hole of the through-holes of the conical piece matching with the one through-hole of the wall through which the probe has been inserted, and performing an hermetical welding of the probes to the conical piece.

Advantageously, there are three through-holes, and one through-hole of the three through-holes is shifted from a linear axis on which two other through-holes of the three through-holes are aligned and the one through-hole of the three through-holes is equidistant from the two through-holes of the three through-holes to have an arrangement of the through-holes in shape of an isosceles triangle.

As all the probes have a different length, they do not interact with each other, permitting advantageously to have more accurate measurements.

The guide also permits not to have to weld the probes to spacers to keep the probes at a constant distance between each other thanks to its closing parts comprising holes to insert the probes. Thanks to the conical piece closing the end of the guide that is inside the coke oven, and thanks to the hermetical welding, clogging of this area of the apparatus is also prevented and insertion inside the coke oven is enhanced.

Finally, it is easy in the present invention to adapt a coke oven to use the apparatus, as only a hole of the diameter of the guide has to be made in a door of the coke oven.

BRIEF DESCRIPTION OF THE DRAWINGS

Other characteristics and advantages of the invention will become clear from the description that is given thereof below, by way of indication and in no way limiting, with reference to the appended figures, among which.

DETAILED DESCRIPTION

For clarity sake, identical or similar elements are marked by identical reference signs in all figures.

Figure 1:
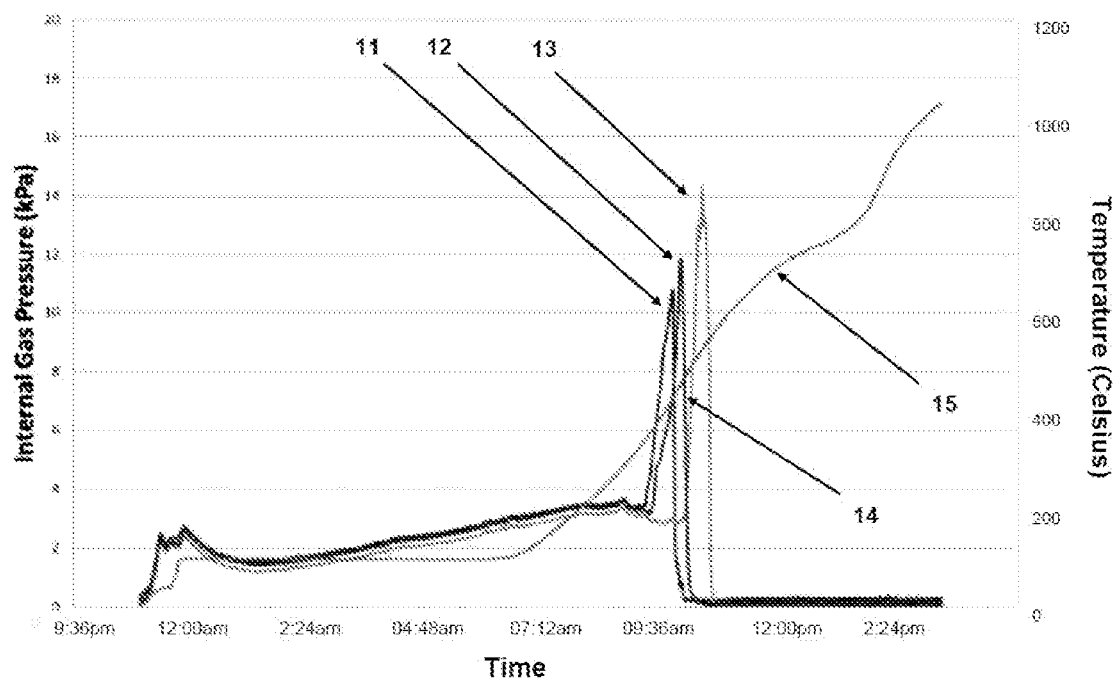
FIG. 1 shows a measure of the internal gas pressure and temperature inside an industrial coke oven with prior art triple probes design.
Figure 2:
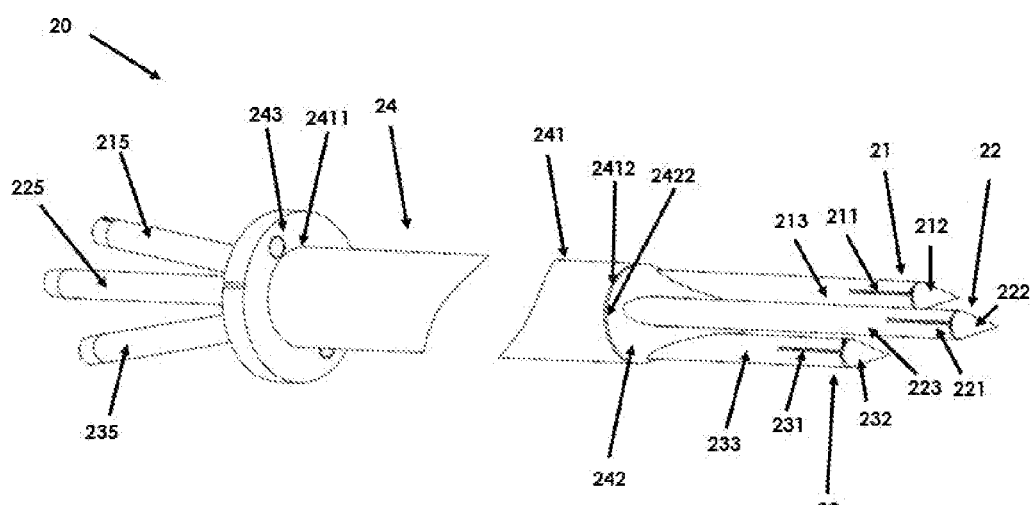
FIG. 2 is a schematic representation of an embodiment of an apparatus according to the invention.

FIG. 2 is a schematic representation of an embodiment of an apparatus according to the invention.

The apparatus 20 according to the invention represented in FIG. 2 comprises three pressure probes 21, 22 and 23 and a tubular guide 24.

The apparatus 20 allows to measure the internal gas pressure of a coke oven. As explained in the prior art, the main goal is to measure the maximum internal gas pressure of a charged coke oven during the heating of coal to coke in order to prevent any damage to the coke oven itself.

The apparatus 20 advantageously comprises the tubular guide 24 comprising two opposite ends 2411 and 2412, two closing parts 242 and 243 and a tubular body 241.

By "tubular" it is meant having a circular cross section with two circular open ends 2411 and 2412. The tubular shape of the guide 24 allows an easy insertion of the apparatus 20 inside a coke oven, an easy adaptation to any coke oven, and a good centring of the apparatus 20 inside the coke oven for accurate measurement. This is obtained by having a circular section, which further allows to have a specific arrangement of the probe which is advantageous for the measurement. This arrangement is further described in the following description.

When the apparatus 20 is inserted into a coke oven, the end 2422 is located inside the coke oven, as is the closing part 242.

According to this embodiment, the apparatus 20 comprises three pressure probes 21, 22 and 23. A probe is a device for measuring a physical quantity inside an environment. For example, a pressure probe is a device for measuring the pressure. In the apparatus 20 according to the invention, the pressure probes 21, 22 and 23 allow to measure the pressure inside a coke oven. Each of the three pressure probes 21, 22 and 23 measures the pressure inside the coke oven independently of the others.

Each pressure probe 21, 22 and 23 comprises a closed end respectively 212, 222 and 232 and a tubular body respectively 213, 223 and 233. Preferably, the closed ends 212, 222 and 232 are of conical shape to ease the insertion of the probes 21,22 and 23 inside the coke oven and to prevent clogging by the coal. By "conical" it is meant of the shape of a cone, such cone having a circular periphery. As mentioned previously, by "tubular" it is meant having a circular cross section. Each tubular body 213, 223 and 233 comprises two rectangular slits facing each other, respectively 211, 221 and 231. As represented in FIG. 2, the rectangular slits 211, 221 and 231 start at the closed end 212, 222 and 232 and extend on a predetermined length along the longitudinal axis of the tubular body 213, 223 and 233. For example, the rectangular slits 211, 221 and 231 can have a length along the longitudinal axis of the tubular body 213, 223 and 233 of 30 millimeters and a width of 1 millimeter. The rectangular slits 211, 221 and 231 can also be placed anywhere else on the tubular body 213, 223 and 233, as long as the rectangular slits 211, 221 and 231 are inside the coke oven and outside the tubular guide 24.

Figure 3:
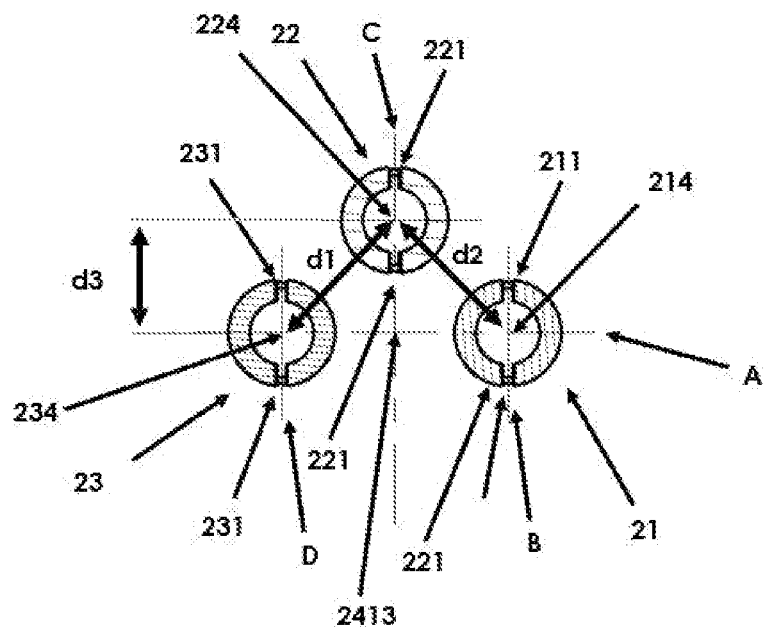
FIG. 3 is a cross-sectional view of the pressure probes of the apparatus according to the invention.

FIG. 3 illustrates a cross-sectional view of the arrangement of the probes according to the invention.

A cross-section of the probes 21, 22 and 23 in a plane perpendicular to the longitudinal axis along which the tubular body 213, 223 and 233 of FIG. 2 extends is represented in FIG. 3. The cross-section of each probe 21, 22 and 23 shown in FIG. 3 is a cross-section at half the length of each of the rectangular slits respectively 211, 221 and 231.

As disclosed above, each tubular body 213, 223 and 233 respectively of the pressure probes 21, 22 and 23 comprises two rectangular slits respectively 211, 221, 231. The slits are rectangular through-holes, facing each other. For example, as represented in FIG. 3, the two holes 211 face each other as the axis along which they extend is perpendicular to the vertical axis B. The two holes 221 face each other as the axis along which they extend is perpendicular to the vertical axis C. The two holes 231 face each other as the axis along which they extend is perpendicular to the vertical axis D. Two holes face each other if one of the holes is on one side of the tubular body and the other hole is on the other side, symmetrically with respect to the center of the circle. The rectangular slits allow to have pressure probes working as Pitot tubes to accurately measure the pressure inside the coke oven.

Figure 4:
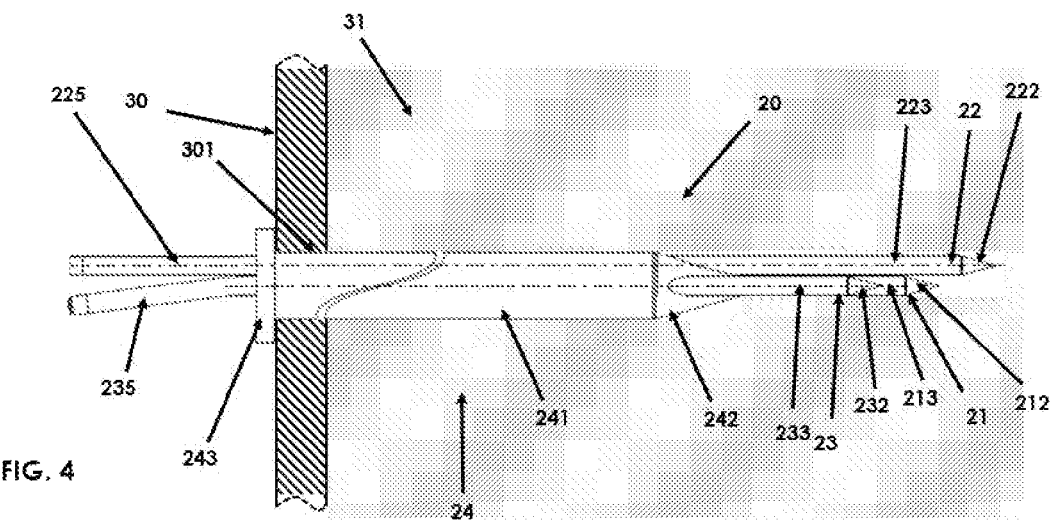
FIG. 4 is a side view of an apparatus according to the invention when inserted into a coke oven.

The probes are arranged so as to accurately measure the pressure, whatever the location of the thermal center of the coke oven. This particular arrangement is represented in FIGS. 2, 3 and 4 and is made possible thanks to the closing part 242 represented in detail in FIGS. 5a and 5b.

The particular arrangement of the probes is a triangular shape formed by the three probes, an isosceles triangle. As represented in FIG. 3, two of the three pressure probes are aligned on a linear axis and the last probe is shifted from such axis and is equidistant from the two others. The two pressure probes 21 and 23 are aligned on the linear axis A. The third pressure probe 22 is shifted from the linear axis A of a predetermined distance d3. The center 224 of the pressure probe 22 is equidistant from the center 214 and 234 of the pressure probes 21 and 23, i.e. the distance d1 between the center 224 of the pressure probe 22 and the center 234 of the pressure probe 23 is equal to the distance d2 between the center 224 of the pressure probe 22 and the center 214 of the pressure probe 21. When mentioning that "the pressure probe 22 is equidistant from the pressure probes 21 and 23", it is meant that the center 224 of the pressure probe 22 is equidistant from the center 214 and 234 of the pressure probes respectively 21 and 23. Having an arrangement of the probes 21, 22 and 23 in a triangular shape allows to have a better centering of the pressure measurement compared to prior art.

In a preferred embodiment, in a cross-sectional view of the tubular guide 24 in a plane perpendicular to the axis along which the tubular guide 24 extends, the center of the guide 24 is taken at the crossing point of the linear horizontal axis A and the linear vertical axis C of FIG. 3, that is the point 2413.

The guide 24 of the apparatus 20 according to the invention as represented in FIG. 2 allows to maintain the probes in such a triangle-shaped arrangement. To do so, the guide 24 comprises a closing part 242 having a conical shape and another closing part 243. Each of the ends 2411 and 2412 of the tubular body 241 of the tubular guide 24 comprises a mean to close said end, the mean comprising as much through-holes as there are probes 21, 22 and 23 so that the probes 21, 22 and 23 may be inserted through these through-holes. Preferably, the means to close the ends 2411 and 2412 are closing parts 242 and 243 which are welded respectively to the ends 2412 and 2411 of the tubular body 241 of the tubular guide 24. Preferably, the closing part 243 is a circular wall, but the invention also covers the embodiments where the closing part 243 is any other closing part 243 enabling to close the end 2411. The circular wall 243 comprises three through-holes, one for each pressure probe 21, 22 and 23. The closing part 242 to close the end 2412 is a conical-shaped piece represented in FIGS. 5a and 5b. The invention also covers the embodiments where the closing part 242 is a circular wall or any other closing mean of the end 2412. The advantage in using a conical-shaped piece 242 is to ease the insertion of the apparatus 20 into the coke oven and to avoid clogging by the coal.

Each closing part 242 and 243 is perforated and comprises as many holes as there are pressure probes. Preferably, the apparatus 20 comprises three pressure probes 21 to 23, but it can comprise more pressure probes than represented. In such cases, the probes are not arranged in a triangle-shape, but rather in a square shape or in a pentagon shape around the center of the guide 24 when viewing in a cross-sectional view according to a plane perpendicular to the axis along which the tubular body 241 of the tubular guide 24 extends.

The perforations are made so as to create through-holes in the closing parts 242 and 243. The through-holes made in each closing part have to match the through-holes of the other closing part. It is meant by "match" that the center of each through-hole is aligned with the center of its matching through-hole in the other closing part when the closing parts are welded to the tubular body 241 of the tubular guide 24. By doing so, the probes 21 to 23 are arranged in an isosceles triangle and the probes 21 to 23 can be inserted from one closing part 243 to the closing part 242 and protrude from the closing part 242. The pressure probes 21 to 23 protrude enough so that the rectangular slits 211, 221 and 231 are fully inside the coke oven and measure the pressure inside the coke oven and are not inside the guide 24.

FIG. 4 is a side view of an apparatus according to the invention when inserted into a coke oven.

The tubular guide 24 is configured to receive the pressure probes 21 to 23 such that the front part of the tubular body 213, 223 and 233 of each of the three pressure probes is located inside the coke oven 31 and the opposite rear part of the tubular body 213, 223 and 233 is outside the coke oven. As such, the closed end 212, 222 and 232 of each of the three pressure probes is inside the coke oven, as are each of the rectangular slits 211, 221 and 231 of the tubular bodies, and the closed end 243 is outside the coke oven 31, as are the pressure sensors (see 61, 62, 63 in Figure). connected to each of the probes 21, 22 and 23. The rectangular slits are thus located in the front part of the pressure probes 21 to 23, so are the closed ends 212, 222 and 232 of each of the three pressure probes. Preferably, the through-holes in the closing parts 242 and 243 allow the guide 24 to receive and guide the pressure probes 21 to 23 in the coke oven. Preferably again, the closing part 243 has a diameter larger than the hole in the oven door 30 to block the insertion of the apparatus 20 when a desired length of insertion is reached. This allows to have a predetermined length of insertion inside the coke oven 31 and to enhance the quality and accuracy of the pressure measurements by having a better centering.

By doing so, the rectangular slits 211, 221 and 231 are inside the coke oven 31 and the pressure sensors (see 61, 62, 63 in FIG. 6) are outside the coke oven 31, preventing thus their deterioration. The guide 24 preferably covers at least half the length of the pressure probes 21 to 23 that is located inside the coke oven, so as to prevent heat distortions of the pressure probes 21 to 23.

A hole 301 is made in the coke oven door 30 to enable the horizontal insertion of the guide 24 inside the coke oven 31 through the hole. Preferably, the hole has the same diameter as the tubular body 241 of the tubular guide 24. By "horizontal insertion" it is meant an insertion according to an axis perpendicular to the coke oven door 30, parallel to the plane along which the floor of the coke oven 31 extends when the coke oven 31 is placed on the ground, the axis extending inside the coke oven 31, when the coke oven door 30 is placed on a side of the coke oven 31.

The parts of the tubular bodies 213, 223 and 233 of each of the three pressure probes which are inside the coke oven 31 have different lengths from one another. The probes 21 to 23 are thus longitudinally shifted from one another. By doing so, any interaction between the probes in terms of heat and measurement is avoided.

The apparatus 20 also comprises pressure sensors (see 61, 62, 63 in FIG. 6), one for each pressure probe 21 to 23. Preferably, the pressure sensors are connected to the end 215,225,235 of the tubular body 213, 223, 233 of each of the probes 21 to 23 that is outside the coke oven, preferably again via rubber tubes. The pressure sensors are configured to measure a pressure and generate at least one signal as a function of said measured pressure. The apparatus 20 may also comprise at least one thermocouple to measure the temperature inside the coke oven 31.

Figure 5A:
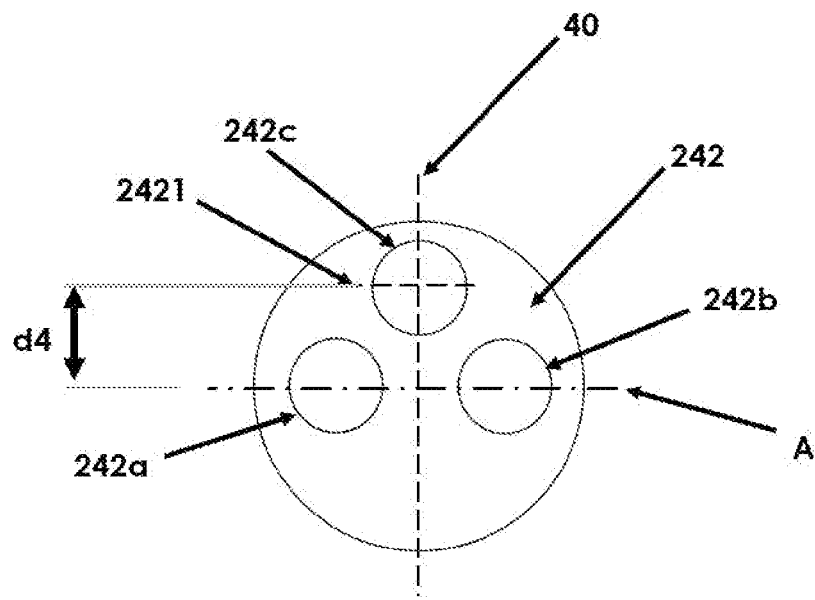
FIGS. 5a and 5b show a conical end of the guide of an apparatus according to the invention.
Figure 5B:
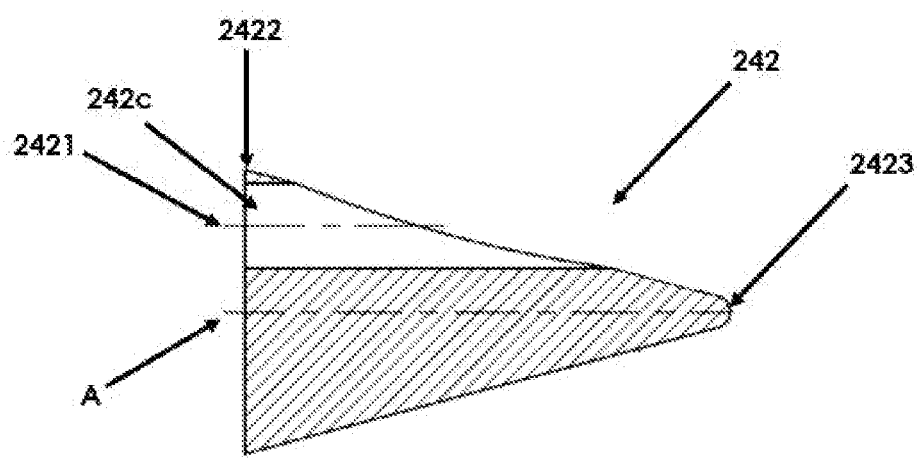

The conical piece 242 is represented in FIGS. 5a and 5b. As represented in FIG. 5a, the conical piece 242 comprises three through-holes arranged in an isosceles triangle shape to maintain the probes in this triangle-shape arrangement. Two of the three through-holes are aligned on a linear axis A and the other through-hole of the three through-holes is shifted from the linear axis A and is equidistant from the two through-holes. The two through-holes 242a and 242c are aligned on the linear axis A. The through-hole 242c is shifted from the linear axis A of a predetermined distance d4. The center of the through-hole 242c is equidistant from the center of the through-holes 242a and 242c, that is the distance between the center of the through-hole 242c and the center of the through-hole 242a is equal to the distance between the center of the through-hole 242c and the center of the through-hole 242b. Having an arrangement of the through-holes 242a, 242b and 242c in a triangular shape allows to maintain the pressure probes 21 to 23 in a triangular shape and thus a better centering of the pressure measurement than in the prior art.

FIG. 5b shows a cross-sectional side view of the conical piece 242. The holes 242a, 242b and 242c are through-holes As represented in FIG. 2, the conical piece 242 has a circular periphery 2422 hermetically welded at the end 2412 of the tubular body 241 of the tubular guide 24 such that the tip 2423 of the conical piece 242 is extending outside of the tubular guide 24. When inserted inside the coke oven, the tip 2423 of the conical piece 242 is the first part of the tubular guide 24 to be inserted inside the coke oven 31. This closing part 242 has a conical shape in order to prevent clogging by the coal during insertion.

Moreover, the periphery of each of the three holes of the conical piece 242 is preferably hermetically welded at the corresponding pressure probes 21 to 23 when inserted inside the guide 24. Therefore, the probes 21 to 23 cannot move inside the guide 24 and can provide accurate measurement of the pressure.

Figure 6:
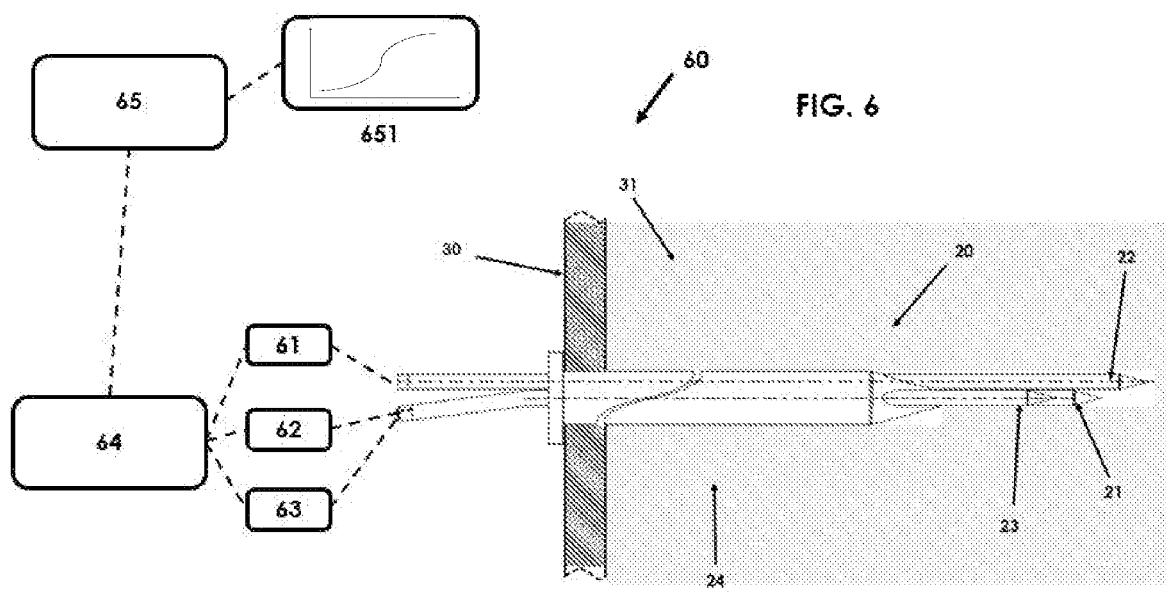
FIG. 6 is a schematic representation of a system according to the invention.

FIG. 6 represents schematically a system according to the invention.

The system 60 represented in FIG. 6 comprises at least one apparatus 20 for measuring the internal gas pressure inside a coke oven, at least one pressure sensor 61, 62 and 63 per pressure probe 21 to 23 of the apparatus 20, at least one transmission module 64 to transmit the pressure signal generated by the pressure sensors 61 to 63 in response to the pressure measured by the pressure sensors 61 to 63, and at least one recorder 65. The recorder 65 is configured to store the signal, for example by storing it in a database for later use. The recorder 65 can optionally be connected to a display 651 to display in real time or in delayed time the internal gas pressure measurements. In a preferred embodiment, the transmission module 64 permits to transmit wirelessly the pressure data, for example using known wireless protocols such as Wifi®, Bluetooth®, LoRa® or any other known wireless protocol. The transmission can also be wired. Although not illustrated, a thermocouple is inserted inside each probe 21 to 23 for measuring the temperature.

The invention also concerns a method for manufacturing the apparatus 20 according to the invention.

Figure 7:
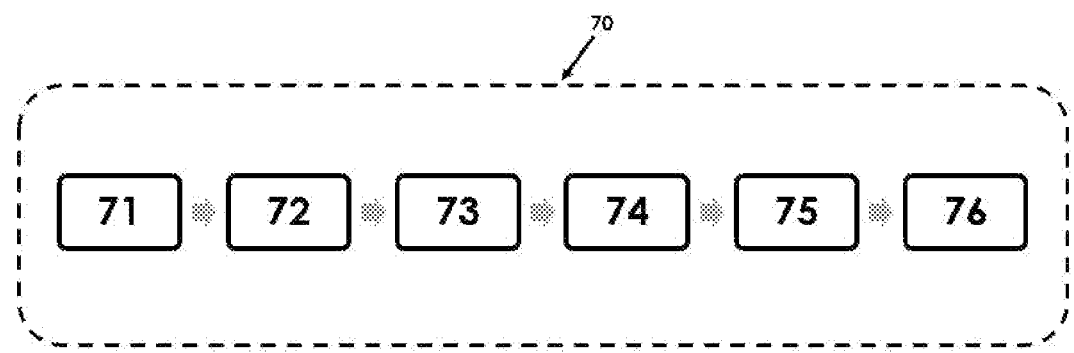
FIG. 7 is a schematic representation of a manufacturing method of an apparatus according to the invention.

FIG. 7 represents schematically a method for manufacturing the apparatus 20 according to the invention.

The method 70 represented in FIG. 7 comprises a step 71 of perforating a wall to form three through-holes wherein two of the three through-holes are aligned on a linear axis and the third through-hole is shifted from said axis and is equidistant from the two other through-holes. This step enables to create the closed end 243 that will be welded on an end of the tubular guide 24 in a further step of the method 70. The perforated wall can be of any shape or form, preferably it is a circular wall. The wall 243 can also be squared, or of any other shape that enables to close the tubular guide 24 while enabling to stop its insertion inside the coke oven 31 when inserted of a predetermined length.

Another step 72 of the method 70 comprises welding the wall 243 to a periphery of an end of the tubular guide 24. Thus, the wall 243 can act as a support and guide for the probes thanks to its through-holes perforated at step 71, as well as a stop to stop the insertion of the guide 24 inside the coke oven when inserted on a predetermined length.

The method 70 further comprises a step 73 of perforating a conical piece 242, the conical piece 242 comprising at least a conical wall having a circular periphery 2422, the perforating being carried out to form three through-holes 242a, 242b and 242c in the conical wall wherein two of the three through-holes are aligned on a linear axis and the other through-hole of the three through-holes is shifted from the linear axis and is equidistant from the two through-holes. This step enables to create the other closed end 242 that will be welded on the other end of the tubular guide 24 in a future step of the method 70.

The method 70 further comprises a step 74 of performing an hermetical welding of the periphery 2422 of the conical wall of the conical piece 242 to a periphery of the other end 2412 of the tubular guide 24 such that the tip 2423 of the conical piece 242 is extending outside of the tubular guide 24 and such that the arrangement of the through-holes of the conical piece 242 matches the arrangement of the through-holes of the wall 243. As explained before, the term "matches" means the two shapes formed by the arrangement of the through-holes of each closing part 242 and 243 are aligned and that the center of each through-hole is aligned with its corresponding hole. This permits to insert the pressure probes 21, 22 and 23 and to maintain the pressure probes inside the guide 24 in a particular shape with only two support points: the two closing parts 242 and 243. Preferably again, the shape formed by the through-holes and then by the pressure probes 21 to 23 when inserted is an isosceles triangle, for a better centering of the pressure measurements.

The method 70 further comprises a step 75 of inserting the three probes 21 to 23 into the tubular guide 24, each probe being inserted through a through-hole of the wall 242 and through the through-hole of the conical piece 243 matching with the through-hole of the wall 242 in which the probe has been inserted. As explained before, this enables the tubular guide 24 to receive the pressure probes 21 to 23, maintain them in a particular arrangement, and guide them to the inside of the coke oven 31.

Finally, the method 70 further comprises a step 75 of performing an hermetical welding of the probes 21 to 23 to the conical piece 242, in order to maintain the probes so that the pressure measurement is not impacted by a movement of the probes.

Figure 8:
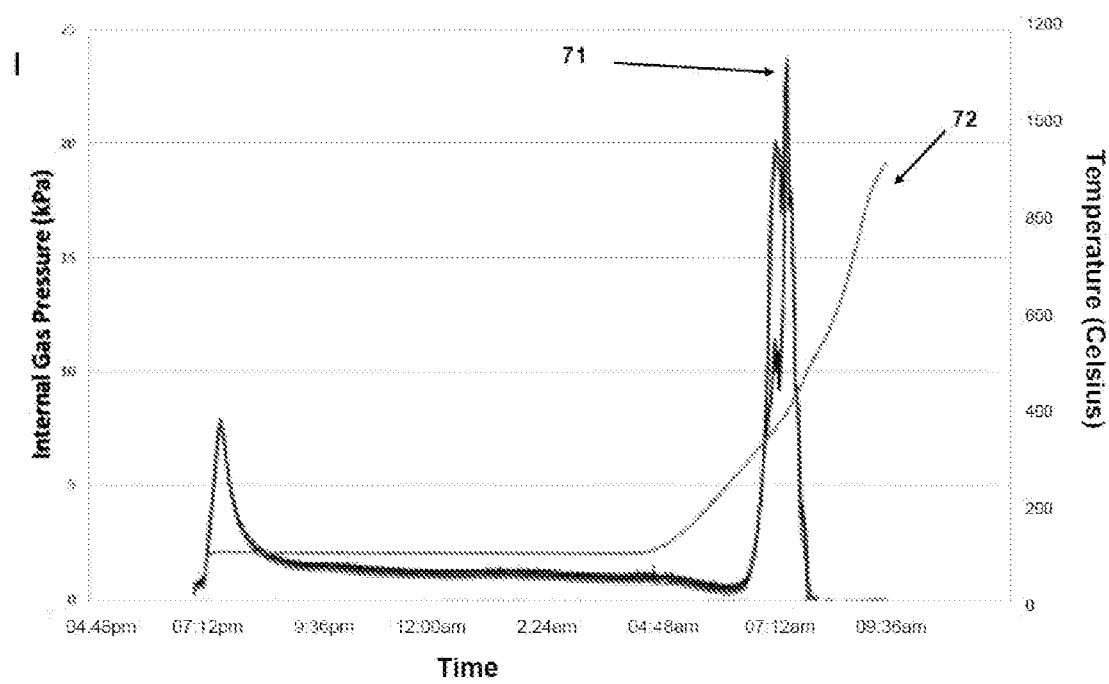
FIG. 8 shows a measure of the internal gas pressure and temperature inside an industrial coke oven with the apparatus according to the invention.

FIG. 8 shows a measure of the internal gas pressure and temperature inside an industrial coke oven with the apparatus according to the invention.

Thanks to the invention, the pressure curves overlap. That is the result of a good centering of the pressure probes 21 to 23 inside the coke oven 31. There is therefore only one pressure peak 71 that is higher than when measuring the pressure with the state-of-the-art triple probes design, then illustrating the effective centering of the probes. In such a case, the present invention detects a potential risk for the coke oven while the prior art triple probes design did not detect critical pressure levels.

Moreover, the temperature curve 72 does not show the two inflexion points as in the prior art, then also illustrating the centering of the probes. The pressure measurements with the apparatus 20 according to the invention are thus more accurate, making it possible to prevent oven wall damages due to high internal gas pressure.

What is claimed is:

1. An apparatus for measuring an internal gas pressure of a coke oven, the apparatus comprising:
   a guide receiving three pressure probes each extending from a rear part to a front part, and each of the three pressure probes being connected to a pressure sensor, the guide having a circular cross section defining a tubular guide receiving the three pressure probes arranged in shape of an isosceles triangle, the tubular guide being configured to receive, guide and maintain the three pressure probes, the tubular guide having two ends and the guide including two closing parts, each closing part being configured to close one of the two ends of the tubular guide, each closing part including three through-holes arranged in shape of an isosceles triangle, wherein one of the two closing parts is a conical piece including a tip, the conical piece being perforated to form the through-holes.

2. The apparatus as recited in claim 1 wherein each of the pressure probes is longitudinally shifted with respect to the other probes.

3. The apparatus as recited in claim 1 wherein the other of the two closing parts is a wall perforated to form the through-holes, the wall being welded to one of the two ends of the tubular guide.

4. The apparatus according to claim 3, wherein the conical piece has a circular periphery hermetically welded to one end of the tubular guide such that the tip of the conical piece extends outside of the tubular guide.

5. The apparatus as recited in claim 1 further comprising at least one thermocouple inserted into at least one of the three pressure probes.

6. The apparatus as recited in claim 1 wherein a front part of each of the pressure probes includes at least two slits facing each other.

7. The apparatus as recited in claim 1 wherein a front part of each of the pressure probes includes a closed end having a conical shape.

8. The apparatus as recited in claim 1 wherein each pressure sensor is connected to a rear part of a corresponding pressure probe via at least one rubber tube.

9. The apparatus as recited in claim 1 wherein each of the three pressure probes includes a respective tip that protrudes from the conical piece.

10. The apparatus as recited in claim 9 each of the three pressure probes includes a tubular body including two slits respectively, the slits being outside of the tubular guide.

11. A coke oven comprising:
the apparatus as recited in claim 1;
at least one hole, the apparatus being inserted horizontally through the at least one hole such that a front part of each of the at least three pressure probes is inside the coke oven and a rear part of each of the at least three pressure probes is outside the coke oven.

12. A system for measuring the internal gas pressure of the coke oven as recited in claim 11 comprising:
at least one transmission module configured to transmit the at least one signal generated by each of the three pressure sensors; and
at least one recording module configured to record the pressure signal received from the transmission module.

13. A method for manufacturing the apparatus as recited in claim 4 comprising the steps of:
perforating a wall to form at least three through-holes;
welding the wall to a periphery of an end of the tubular guide;
perforating a conical piece, the conical piece including at least a conical wall having a circular periphery and a tip, the perforating being carried out to form at least three through-holes in the conical wall;
performing an hermetical welding of the circular periphery of the conical wall of the conical piece to a periphery of another end of the tubular guide such that the tip of the conical piece extends outside of the tubular guide and such that the arrangement of the through-holes of the conical piece matches the arrangement of the through-holes of the wall;
inserting the at least three probes into the tubular guide, each probe being inserted through one through-hole of the through-holes of the wall and through a through-hole of the through-holes of the conical piece matching with the one through-hole of the wall through which the probe has been inserted; and
performing an hermetical welding of the probes to the conical piece.

* * * * *